United States Patent
Daniels

(10) Patent No.: US 8,034,160 B2
(45) Date of Patent: Oct. 11, 2011

(54) NON-CRYOGENIC NITROGEN GENERATORS AND METHODS OF USE

(75) Inventor: Danny Daniels, Tishomongo, OK (US)

(73) Assignee: Nitro-Lift Technologies, Inc., Lafayette, LA (US)

( * ) Notice: Subject to any disclaimer, the term of this patent is extended or adjusted under 35 U.S.C. 154(b) by 263 days.

(21) Appl. No.: 12/109,659

(22) Filed: Apr. 25, 2008

(65) Prior Publication Data

US 2008/0271598 A1 Nov. 6, 2008

(51) Int. Cl.
*B01D 53/22* (2006.01)

(52) U.S. Cl. ............ 95/45; 95/47; 95/54; 96/4; 96/7; 96/8; 96/10; 55/418.1; 55/419

(58) Field of Classification Search ............ 96/4, 7, 96/8, 10, 9; 95/45, 47, 54, 17, 18; 210/640; 55/418, 418.1, 419
See application file for complete search history.

(56) References Cited

U.S. PATENT DOCUMENTS

| | | | | |
|---|---|---|---|---|
| 3,976,451 A * | 8/1976 | Blackmer et al. | | 96/7 |
| 4,781,907 A * | 11/1988 | McNeill | | 95/54 |
| 4,787,919 A * | 11/1988 | Campbell et al. | | 96/8 |
| 5,102,432 A * | 4/1992 | Prasad | | 95/54 |
| 5,378,263 A * | 1/1995 | Prasad | | 95/54 |
| 5,388,413 A * | 2/1995 | Major et al. | | 95/54 |
| 5,429,662 A * | 7/1995 | Fillet | | 95/45 |
| 5,588,984 A * | 12/1996 | Verini | | 96/10 |
| 5,649,995 A * | 7/1997 | Gast, Jr. | | 95/54 |
| 5,709,733 A * | 1/1998 | Hachisuka et al. | | 95/45 |
| 5,840,098 A * | 11/1998 | Barbe et al. | | 95/54 |
| 6,128,919 A * | 10/2000 | Daus et al. | | 95/51 |
| 6,632,266 B2 * | 10/2003 | Thomas et al. | | 95/51 |
| 7,537,641 B2 * | 5/2009 | Lokhandwala et al. | | 95/45 |
| 7,588,612 B2 * | 9/2009 | Marwitz et al. | | 96/7 |
| 7,827,974 B2 * | 11/2010 | Beckmann | | 95/47 |
| 2002/0007732 A1 * | 1/2002 | Mohr et al. | | 95/45 |
| 2005/0092177 A1 * | 5/2005 | Bonchonsky et al. | | 95/138 |
| 2007/0125232 A1 * | 6/2007 | Wrosch et al. | | 96/4 |

* cited by examiner

*Primary Examiner* — Jason M Greene
(74) *Attorney, Agent, or Firm* — Medlen & Carroll, LLP

(57) ABSTRACT

This invention relates to gas generators and methods for their use. In some embodiments, the invention relates to devices and methods of generating a gas enriched in a specific component. In other embodiments, the devices are configured to pressurize and regulate the temperature of atmospheric air prior to passing said air through a selectively permeable gas membrane. In further embodiments, a device is also configured to preheat said selectively permeable gas membrane.

7 Claims, 10 Drawing Sheets

| COMPONENT LEGEND (SEE COMPONENT DETAIL FOR ADDITIONAL SPECIFICATIONS) ||
|---|---|
| D | VALVES |
| RV1 | PRESSURE RELIEF VALVE ( NODE 1) |
| RV2 | PRESSURE RELIEF VALVE ( NODE 2) |
| RV3 | PRESSURE RELIEF VALVE ( NODE 3) |
| RV4 | PRESSURE RELIEF VALVE ( NODE 4) |
| RV5 | PRESSURE RELIEF VALVE ( NODE 5) |
| RV6 | PRESSURE RELIEF VALVE ( NODE 6) |
| CV1 | CHECK VALVE (MEMBRANE MANIFOLD DISCHARGE) |
| CV2 | CHECK VALVE (BOOSTER DISCHARGE) |
| MV-IC1 | MANUAL VALVE (IC1 COOLANT REGULATION) |
| MV-IC2 | MANUAL VALVE (IC2 COOLANT REGULATION) |
| MV-AC2 | MANUAL VALVE (AC2 COOLANT REGULATION) |
| MV-FAC | MANUAL VALVE (FAC COOLANT REGULATION) |
| MV-LC | MANUAL VALVE (LC COOLANT REGULATION) |
| MV-HC | MANUAL VALVE (HC COOLANT REGULATION) |
| TCV | TEMP CONTROL VALVE (AC1 DISCHARGE TEMP CONTROL) |
| BV | NEEDLE VALVE (18 FOR MEMBRANE BALANCING) |
| FFV1 | FULL FLOW VALVE (LOM1 PRESSURE REGULATION) |
| FFV2 | FULL FLOW VALVE (LOM2 PRESSURE REGULATION) |
| FFV3 | FULL FLOW VALVE (LOM3 PRESSURE REGULATION) |
| LCV1 | LEVEL CONTROL VALVE (OS1 CONTROL) |
| LCV2 | LEVEL CONTROL VALVE (OS2 CONTROL) |
| LCV3 | LEVEL CONTROL VALVE (OS3 CONTROL) |
| SV1 | SAMPLE VALVE FOR N2 SAMPLE |
| SV2 | SAMPLE VALVE FOR COOLANT SAMPLE |
| 3WV1 | 3-WAY VALVE (FEED AIR WARM-UP DIVERT) |
| 3WV2 | 3-WAY VALVE (N2 DIVERT) |
| 3WV3 | 3-WAY VALVE (PURGE/VENT SELECT) |
|  |  |

FIG. 4A

| COMPONENT LEGEND (SEE COMPONENT DETAIL FOR ADDITIONAL SPECIFICATIONS) ||
|---|---|
| | REGULATIONS |
| BPR1 | BACK PRESSURE REG. (FAC DISCHARGE CONTROL) |
| BPR2 | BACK PRESSURE REG. (MB PRESS CONTROL) |
| LREG1 | LUBE OIL REGULATOR |
| | |
| | SENSORS |
| TS1 | TEMP SENSOR 1 (IC1 DISCHARGE MONITOR) |
| TS2 | TEMP SENSOR 2 (AC1 DISCHARGE MONITOR & TCV SIGNAL) |
| TS3 | TEMP SENSOR 3 (FEEDBACK FOR FCV-AH) |
| TS4 | TEMP SENSOR 4 (OS2 DISCHARGE MONITOR) |
| PS1 | PRES. SENSOR 1 (BPR1 MONITOR) |
| PS2 | PRES. SENSOR 2 (BPR2 MONITOR) |
| PS3 | PRES. SENSOR 3 (S1-BC MONITOR) |
| PS4 | PRES. SENSOR 4 (S2-BC MONITOR) |
| | |
| | HEAT EXCHANGERS |
| IC1 | FEED AIR INTERCOOLER (SHELL/TUBE) |
| AC1 | FEED AIR AFTERCOOLER (SHELL/TUBE) |
| IC2 | BOOSTER INTERCOOLER |
| AC2 | BOOSTER AFTERCOOLER |
| HC | HYDRAULIC OIL COOLER |
| LC | LUBE OIL COOLER |
| | |
| | VESSELS |
| OS1 | OIL SEPARATOR 1 |
| OS2 | OIL SEPARATOR 2 |
| OS3 | OIL SEPARATOR 3 |
| LOR | LUBE OIL RESERVOIR |
| | |

FIG. 4B

| COMPONENT LEGEND<br>(SEE COMPONENT DETAIL FOR ADDITIONAL SPECIFICATIONS) ||
|---|---|
| FILTERS ||
| PF1 | PARTICULATE FILTER 1 (AIR) |
| PF2 | PARTICULATE FILTER 3 (AIR) |
| PF3 | PARTICULATE FILTER 3 (AIR) |
| ACF | ACTIVATED CARBON FILTER |
| LPF1 | LUBE PARTICULATE FILTER 1 |
| LPF2 | LUBE PARTICULATE FILTER 2 |
| LPF3 | LUBE PARTICULATE FILTER 2 |
|  |  |
| MANIFOLDS ||
| LOM1 | LUBE OIL MANIFOLD 1 |
| LOM2 | LUBE OIL MANIFOLD 2 |
| LOM3 | LUBE OIL MANIFOLD 3 |
| LOM4 | LUBE OIL MANIFOLD 4 |
|  |  |
| PUMPS ||
| LOP1 | LUBE OIL PUMP 1 (POS. DISP.) |
| LOP2 | LUBE OIL PUMP 2 (POS. DISP.) |
| LOP3 | LUBE OIL PUMP 3 (POS. DISP.) |
| CP | COOLANT PUMP (CENTRIFUGAL) |
|  |  |
| OTHER COMPONENTS ||
| S1-FAC | STAGE 1 FEED AIR |
| S2-FAC | STAGE 2 FEED AIR |
| MB | MEMBRANE BANK |
| S1-BC | STAGE 1 BOOSTER |
| S2-BC | STAGE 2 BOOSTER |
| C1 | MAIN H20 TO AIR COOLER |
| C2 | TRIM H20 TO AIR COOLER |

FIG. 4C

NON-CRYOGENIC NITROGEN GENERATORS AND METHODS OF USE

FIELD OF INVENTION

This invention relates to gas generators and methods for their use. In some embodiments, the invention relates to devices and methods of generating a gas enriched in a specific component. In other embodiments, the devices are configured to pressurize and regulate the temperature of atmospheric air prior to passing said air through a selectively permeable gas membrane. In further embodiments, a device is also configured to preheat said selectively permeable gas membrane.

BACKGROUND

Inert gases such as nitrogen are utilized in many industrial processes. The relative low cost and significant abundance of nitrogen as compared to other inert gases makes it particularly attractive for such applications. Nitrogen is particularly attractive for use in industrial well drilling, for example, in oil and natural gas drilling applications. The development of non-cryogenic methods for supplying nitrogen to oil and natural gas drilling applications alleviates costs associated with cryogenic-based generators but issues such as the size of the generator, with its associated operational and maintenance costs, and the difficulty in transporting and relocating the generator remains. A further complication in using such generators is the presence of liquid water in the air membrane separation system that facilitates the partitioning of nitrogen from the other constituents in air. Thus, there is a need for nitrogen generators that allow for maximum nitrogen generating capacity while also allowing for ease of transport and relocation to both on- and off-shore drilling operations.

SUMMARY OF THE INVENTION

This invention relates to gas generators and methods for their use. In some embodiments, the invention relates to devices and methods of generating a gas enriched in a specific component. In other embodiments, the devices are configured to pressurize and regulate the temperature of atmospheric air prior to passing said air through a selectively permeable gas membrane. In further embodiments, a device is also configured to preheat said selectively permeable gas membrane.

In some embodiments, the invention relates to a device comprising: i) a first compressor configured to compress feed air into a first compartment providing compressed air at a first elevated temperature at a first elevated pressure; and ii) a membrane bank comprising a selectively permeable gas membrane configured to receive said compressed air at a second elevated pressure below said first elevated pressure and configured to filter said compressed air providing a component enriched gas; iii) a second compressor configured to compress said component enriched gas into a second compartment at a second elevated pressure. In further embodiments, said component is nitrogen gas. In further embodiments, said first elevated pressure is above 10 psig and below 1000 psig. In further embodiments, said membrane bank is configure to heat said selectively permeable gas membrane at a temperature equal to or above said first elevated temperature. In further embodiments the device further comprises a valve configured to divert a portion of said compressed air at said first elevated temperature over said membrane bank casing.

In other embodiments, the invention relates to a method of generating a component enriched gas comprising: a) providing: i) atmospheric air; ii) a membrane bank comprising a casing covering selectively permeable gas membranes; iii) a first compartment wherein said first compartment is temperature regulated; and iv) compressor configured to compress gas into a second compartment; b) compressing said atmospheric air into said first compartment so as to create compressed air; c) cooling said first compartment; d) reducing pressure such that said compressed air moves through said selectively permeable gas membranes providing a component enriched gas. In further embodiments, said component is nitrogen gas. In further embodiments, said first compartment is temperature regulated by a hydraulic coolant system. In further embodiments, said compressed air is above 10 and below 1000 psig.

In some embodiments, the invention relates to a system of pumps and compressors capable of trapping oil-free air in a vaporized state. In additional embodiments, the invention relates to a generator capable of supplying nitrogen through the separation of ambient air using gas separation membranes. In further embodiments, the invention relates to a device that limits the contamination of said air separation membranes through the prevention of liquid water condensation. In still further embodiments, the invention relates to a computer interface capable of operating and maintaining said generator under conditions appropriate for well drilling.

In some embodiments, the invention relates to a method of generating a component enriched gas comprising: a) providing: i) atmospheric air; ii) a plurality of selectively permeable gas membranes; iii) a compartment; iv) a means for cooling said compartment; and iv) a compressor; b) compressing said air with said compressor into said compartment so as to create compressed air; c) cooling said compartment with said cooling means; d) reducing pressure such that said compressed air moves through said selectively permeable gas membranes so as to create a component enriched gas.

In some embodiments, the invention relates to a gas separation device for enhancing production from an oil or gas drilling operation comprising: a) a housing sufficient for containing the components of said device transportation to and from said oil or gas drilling operation; b) a compression system for condensing ambient air into a vaporous state; c) means for separating a substantial portion of oxygen, argon carbon dioxide and argon from said ambient air to produce a nitrogen enriched gaseous stream; d) an embedded computer system; and e) a means for pressurizing a target area using said nitrogen enriched gaseous stream. In additional embodiments, said compression system is comprised of hydraulic pumps and a feed-air compressor. In other embodiments, said means for separating a substantial portion of oxygen, argon and carbon dioxide from said ambient air comprises an air separation system. In still other embodiments, said system is comprised of a plurality of hollow fiber membranes. In further embodiments, said means for pressurizing a target area using said nitrogen enriched gaseous stream is controlled using a valve. In still further embodiments, said housing is comprised of stainless steel.

BRIEF DESCRIPTION OF THE DRAWINGS

FIGS. 4A through 4C are descriptions of the parts in FIGS. 3A through 3D.

DETAILED DESCRIPTION OF THE INVENTION

Figure 1:
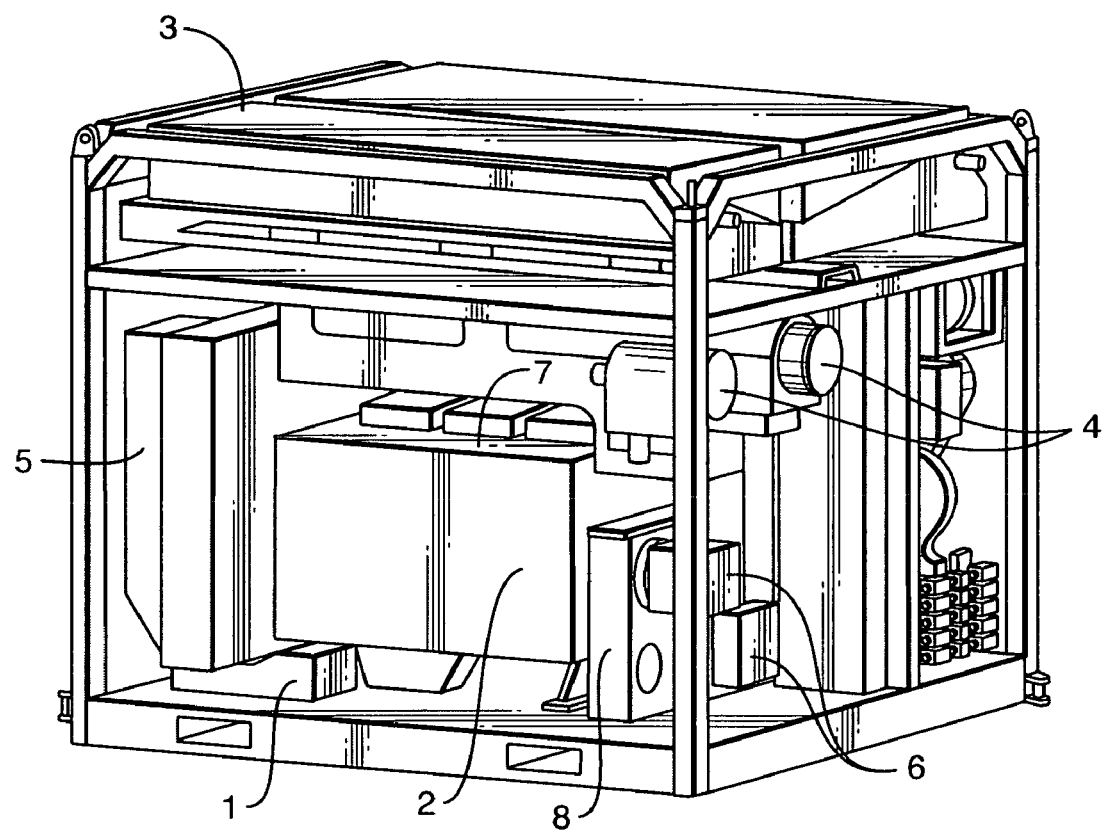
FIG. 1 is an illustration of the engine, hydraulic components, cooling system and membrane-based air separation system comprising the non-cryogenic nitrogen generator.

This invention relates to gas generators and methods for their use. In some embodiments, the invention relates to devices and methods of generating a gas enriched in a specific component. In other embodiments, the devices are configured to pressurize and regulate the temperature of atmospheric air prior to passing said air through a selectively permeable gas membrane. In further embodiments, a device is also configured to preheat said selectively permeable gas membrane.

Gases membranes typically separate component gases by the principle of selective permeation across a nitrogen membrane wall. For nitrogen polymeric membranes, the rate of permeation of each gas is determined by its solubility in the nitrogen membrane material. These membranes break down over time and are typically sensitive to moisture and high temperatures. Nitrogen membranes such as MEDAL™, hydrogen membranes, and carbon dioxide membranes can be purchased from Air Liquide MEDAL 305 Water Street, Newport, Del. 19804

In typical non-cryogenic devices, it is preferable to heat feeder air from about 100 to below 150 degrees Celsius in order to dry the air and prevent water from forming on and damaging the membranes. This was traditionally done by passing air over electric heating elements. Unfortunately, this has the disadvantage of expending tremendous energy and difficulty in maintaining a desired temperature range of the feeder air. In addition, it is desirable to prevent the formation of water in the nitrogen separation membranes that will form if the membranes are cooled sufficiently upon exposure to air.

By compressing the air, one eliminates the need to have an electric generator for a heater. In certain embodiments, the invention relates to heating feeder air by pressurizing the air instead of directly heating it by an electronic element. By compressing the air in a compartment such as a tank comprising a pressure release valve and a hydraulic coolant system, one can control the temperature of the air.

Since air gets warmer when it is compressed, the temperature of the compressed air can be heated above the desired operating temperature for the membranes. Thus, in certain embodiments of the invention, compressed air is cooled before entering the membranes. In further embodiments, the compressed air is passed though particulate filters or exposed to a refrigeration drying process to decrease the amount of water.

If the membranes are cooler than the compressed air, water will form on the membranes. Thus, in certain embodiments of the invention, the membranes are maintained at a temperature equal to or higher than the compressed air. In certain embodiments, this is done by passing a warm gas or liquid around the casing of the membranes (or membrane bank). Another preferred method of heating the membranes is to pass warm, sufficiently dry gas, through the membranes for a sufficient time to raise the temperature of the membranes above the temperature at which condensation will occur in the compressed gas stream at the membrane inlet pressure.

Figure 2:
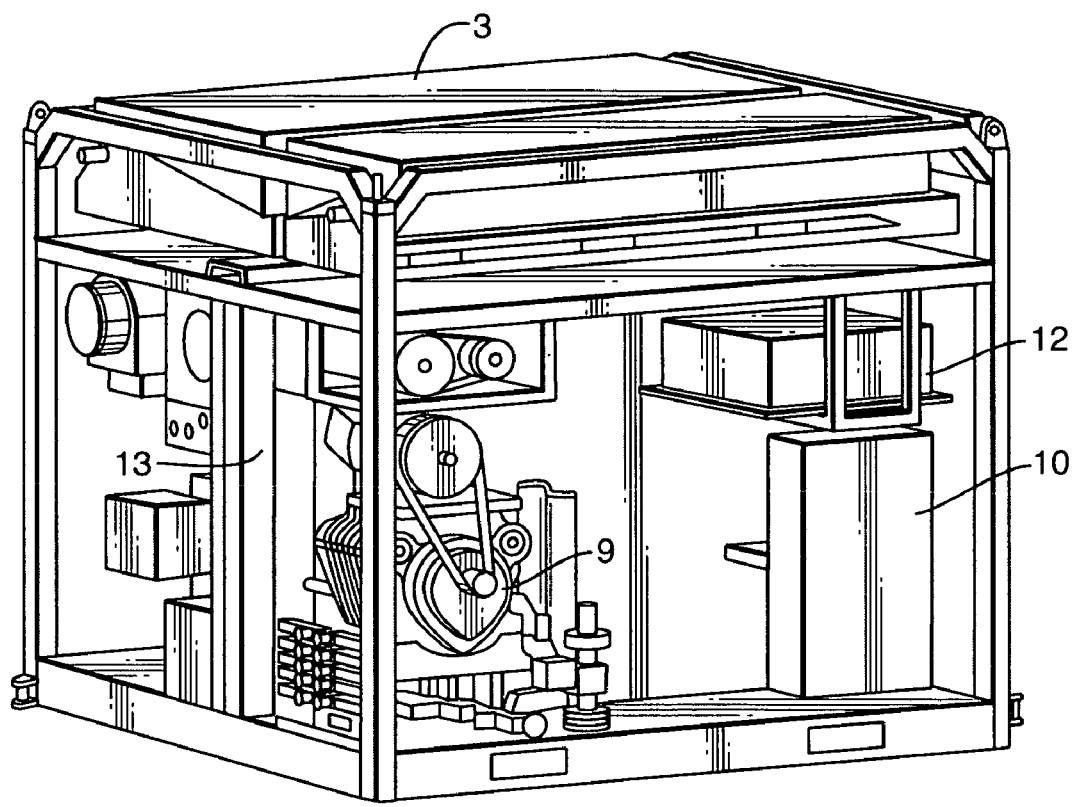
FIG. 2 is an illustration of the compression components, electronic control panel heat exchanging system and membrane—based air separation system comprising the non-cryogenic nitrogen generator.
Figure 3A:
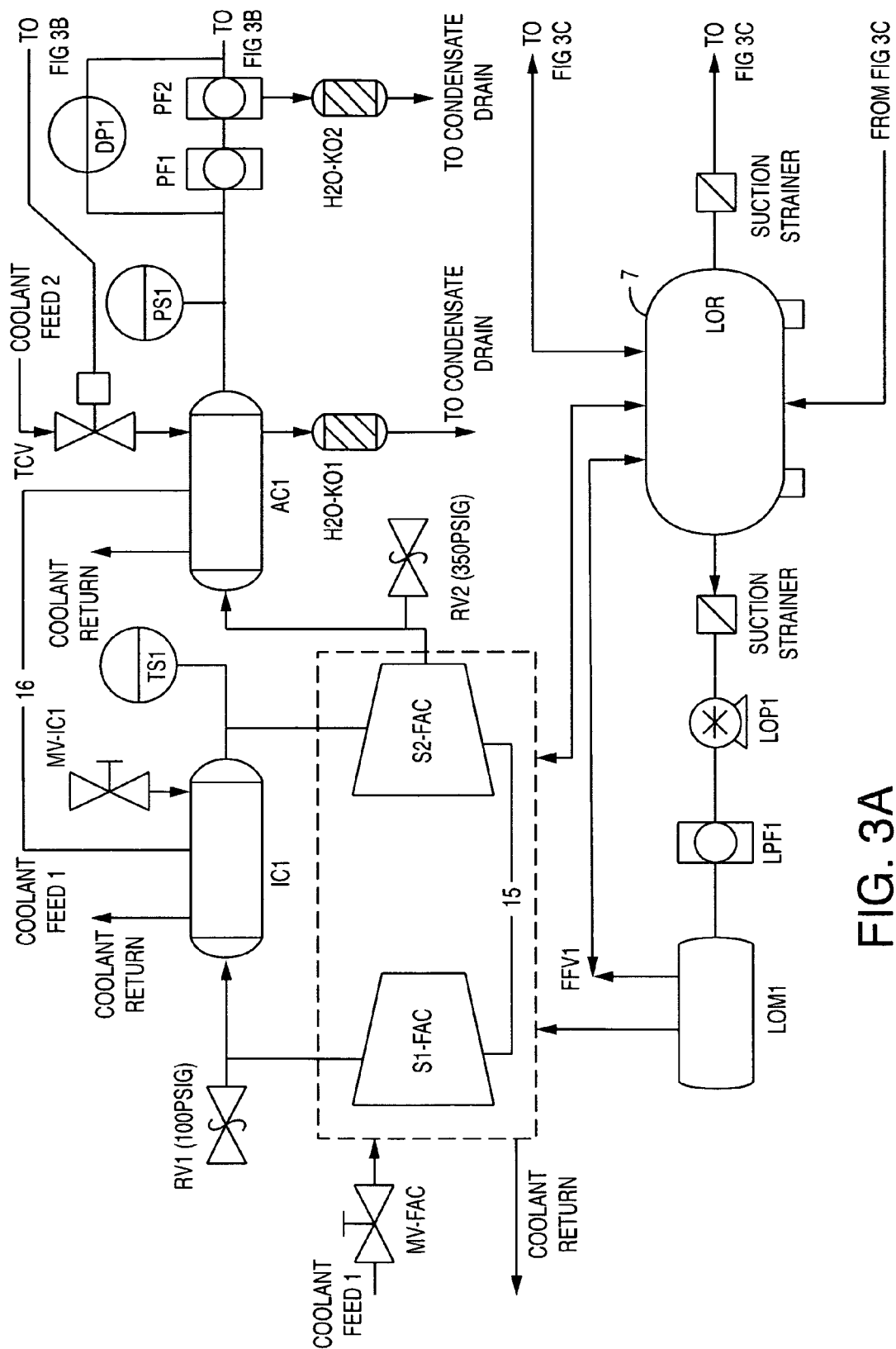
FIG. 3A is a schematic illustration of one embodiment of the non-cryogenic nitrogen generator
Figure 3B:
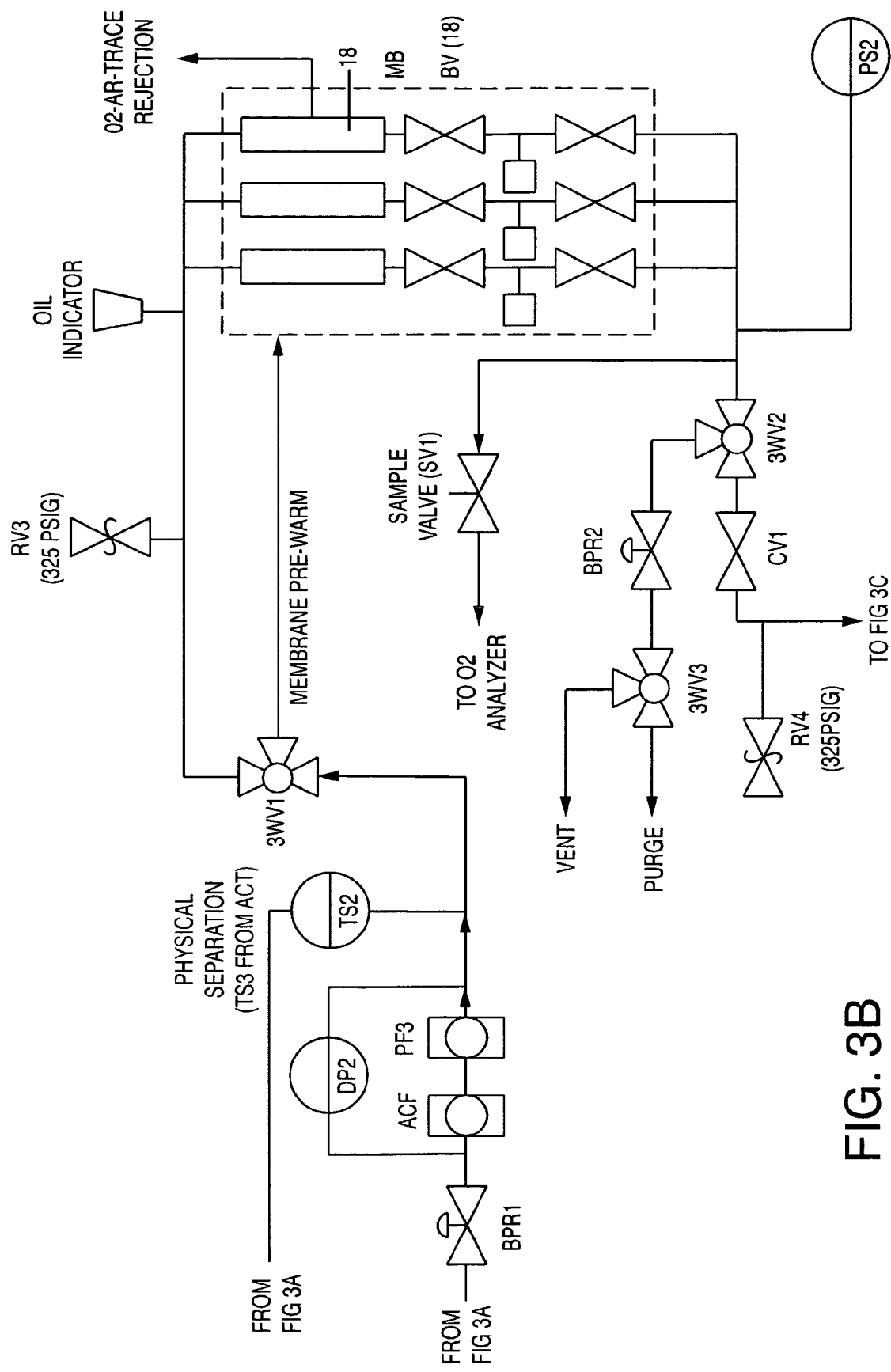
FIG. 3B is a schematic illustration of another embodiment of the non-cryogenic nitrogen generator.
Figure 3C:
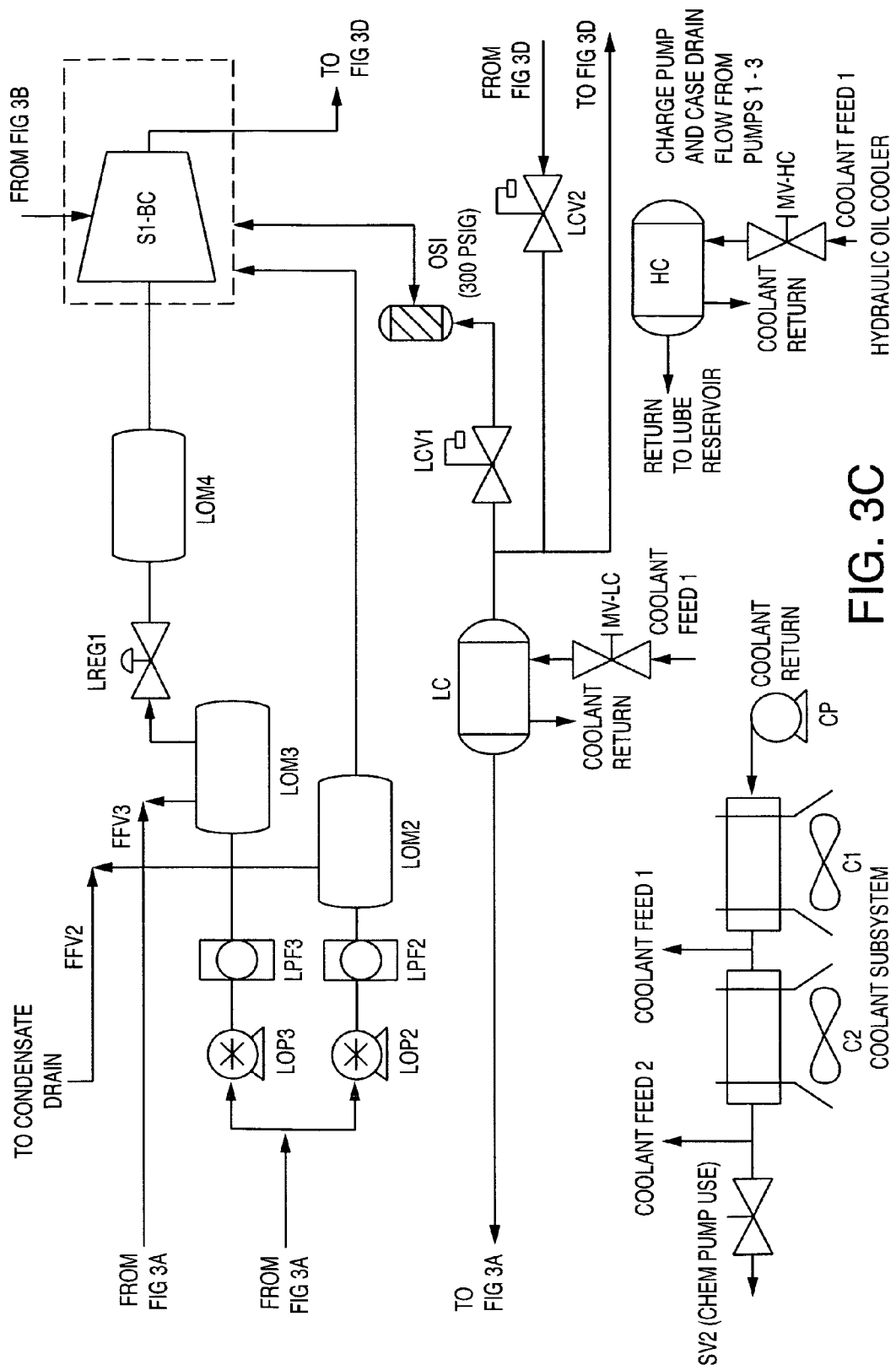
FIG. 3C is a schematic illustration of an additional embodiment of the non-cryogenic nitrogen generator.
Figure 3D:
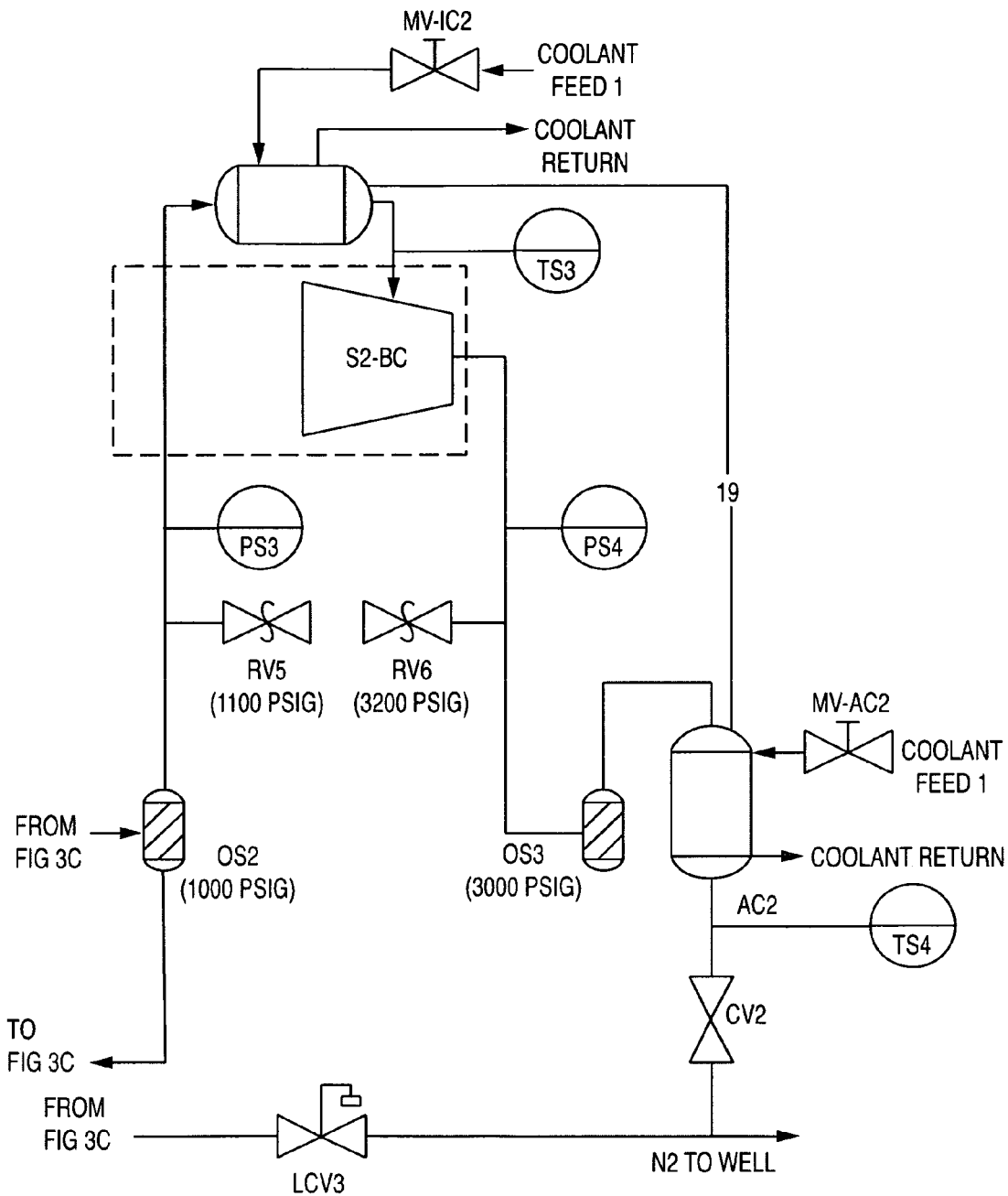
FIG. 3D is a schematic illustration of still another embodiment of the non-cryogenic nitrogen generator.

As depicted in FIGS. 1 and 2, in some embodiments, the present invention is housed in a stainless steel framework (1). It is not intended that the present invention be limited to the use of any particular type of power source. In one embodiment, the device is powered through the use of a diesel engine (2), for example, a Caterpillar C-18 diesel engine. The engine is cooled through a series of deployable air after-coolers (3). For applications requiring additional power from the diesel engine, turbo chargers (4) work in conjunction with the engine. In some embodiments, a radiator (5) is also used to cool the generator during operation. In some embodiments, hydraulic pumps (6), which draw hydraulic fluid from a hydraulic fluid reservoir (7) and are driven by a hydraulic driver (8), are aligned to operate a feed-air compressor (9), which uptakes ambient air and pressurizes said air. In one embodiment, said feed air compressor generates 700 standard cubic feet per minute of compressed air at a pressure of 350 pounds-force per square inch. It is a preferred embodiment of the present invention that said pressurized air is oil-free. In some embodiments, the air is pressurized above ambient conditions to generate a condensed air fraction that exceeds the ambient air temperature. The process is regulated through an electronic control panel (10).

In some embodiments, the feed air to the air membrane separation system (13) is pressurized above the hollow fiber membrane operating pressure. In some embodiments, the feed air is then cooled to the membrane operating temperature, which may or may not cause condensation. The pressure of the feed air stock is then reduced, which decreases the relative humidity of the feed air at the membrane operating temperature and pressure. In some embodiments, the invention relates to a refrigerated drying step to further decrease the amount of water vapor in the air prior to entering the membrane.

In some embodiments, the pressurized air is passed through a microfiber-based filtration system to a series of plate-in-frame heat exchangers (12), heated to a temperature between 115°-125° Fahrenheit through the use of counter flowing, using a circulating glycol/water fluid mixture. In some embodiments, the feed air stock is supplied through bored tubing to a series of hollow fiber membranes that comprise the air membrane separation system. In some embodiments, the membranes comprising the air separation system are preheated before the feed air is fed through the membranes. This may be accomplished by passing a warm fluid around the casings of the membranes, or by passing a warm, sufficiently dry gas through the membranes. This process should be performed for a sufficient time to raise the temperature of the membranes above the temperature at which condensation will occur in the feed air stream at the membrane inlet pressure.

As illustrated in FIGS. 4A through 4C, in some embodiments, the invention relates to a device comprising: i) a first feed compressor (15) configured to compress feed air into an after cooler compartment (16) providing compressed air at a first elevated temperature at a first elevated pressure; and ii) a membrane bank (18) comprising a selectively permeable gas membrane configured to receive said compressed air at a second elevated pressure below said first elevated pressure and configured to filter said compressed air providing a component enriched gas; iii) a second booster (17) compressor configured to compress said component enriched gas into a second compartment at a second elevated pressure.

Figure 5A:
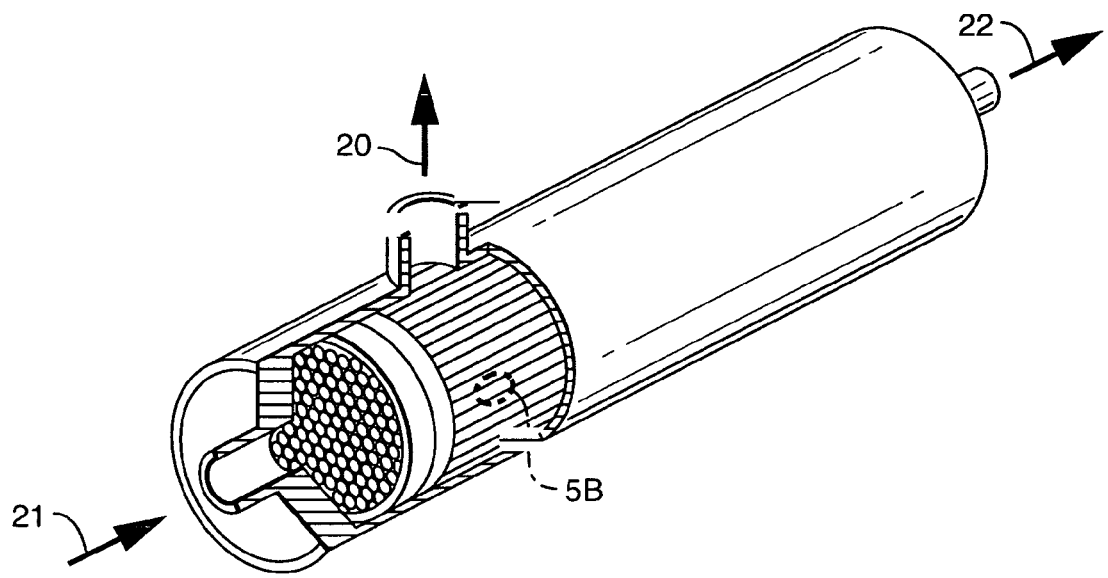
FIGS. 5A and 5B illustrates a membrane bank for separation of feed, e.g., atmospheric, air.
Figure 5B:
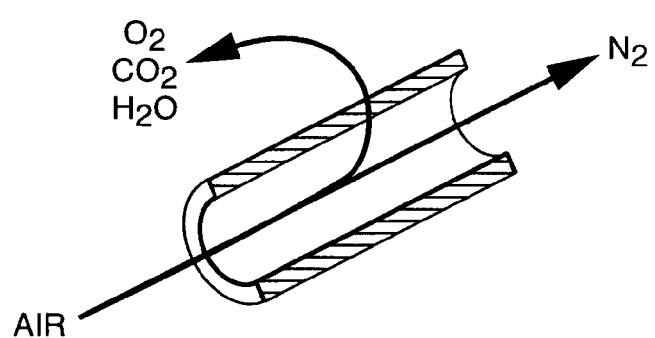

As illustrated in FIGS. 5A and 5B, in certain embodiments, the invention relates to devices disclosed herein that have a membrane bank for separation of feed air, e.g., atmospheric air, (21) using a selectively permeable gas membrane (24) comprising a casing (23) and a vent (20) into a component enriched gas (22). In certain embodiments, the vent can be connected to a vacuum in order to enrich concentration of the separated components without decreasing the quantity of gas flowing through the membrane.

The resulting nitrogen rich gas produced in the air separation membrane system typically has a nitrogen content of at least 95% by volume, preferably 99% by volume, and an oxygen content of no more than 5% by volume, preferably less than about 1% by volume.

In some embodiments, the nitrogen rich gas is sent into a two-stage booster compressor (14). In a preferred embodiment, said booster compressor is a two-stage booster compressor comprising a piston or generator as described in U.S. Pat. Nos. 7,008,200, 6,886,326, 6,530,221, and 6,336,317, hereby incorporated by reference. In some embodiments, the gas is compressed to 250-300 pounds per square inch gauge (psig) in the first stage of the compressor, followed by passage through the heat exchanger and finally to the second stage of the booster compressor, where the gas is pressurized to 3000-5000 psig and may now be used for preferred applications, including the preferred embodiment of injecting the nitrogen gas into a drilling well for the extraction of oil and/or natural gas. It is not intended that the invention be limited by the method of injecting the nitrogen gas. In one embodiment, the injection is carried out through the use of a pneumatic valve.

In a preferred embodiment, the device contains an embedded computer system that allows for an operator to control the device and assess the performance of the device. In one embodiment, said embedded computer system is a General Electric Fanuc embedded computer system.

The present invention also contemplates embodiments relating to a complete nitrogen generator system, commonly referred to as a nitrogen generator skid, in which the size dimensions of said skid have been miniaturized as compared to previously described skids. The skid may be loaded onto a truck, tractor, trailer or any other suitable means of conveyance and transported to the desired location. The skid comprises a housing suitable for containing all of the components of the device. Some of the advantages of using a nitrogen generator skid of minimal size is the reduced risk of accidental injury associated with transporting and operating said skid. It is not intended that the present invention be limited to any particular dimensions. In one embodiment, the generator skid unit comprises a maximum length of ten feet, a maximum width of eight feet and a maximum height of eight feet.

As used herein, the term "elevated temperature" refers to temperatures above those experienced in the earth's atmosphere, preferably above 40 degrees Celsius, and even more preferably above, 50 degree Celsius. Typically between 50 and 150 degree Celsius.

As used herein, the term "elevated pressure" refers to a pressure above those one experiences in the earth's atmosphere, preferably above 10 psig. e.g. between 10 and 5000 psi.

As used herein, the terms "hydraulic" or "hydraulics" refer to the science describing the mechanical properties of liquids. Hydraulic applications include but are not limited to pipe flow, fluid circulatory control, pumps, turbines, hydropower, computational flow dynamics, and flow measurement. Hydraulic machinery uses the principles of hydraulics to do work, using high-pressure hydraulic fluid transmitted throughout the machine to various hydraulic motors and cylinders. The fluid is controlled by control valves and distributed through hoses and tubes.

The terms "compressor" and "booster compressor" refer to devices capable of promoting the compression of a gas. In addition to reducing the volume of a gas, compression naturally increases the temperature of said gas. Common types of gas compressors include but are not limited to centrifugal, diagonal or mixed-flow, axial-flow, reciprocating, rotary screw, scroll and diaphragm compressors. Preferred compressors are described in U.S. Pat. Nos. 7,008,200, 6,886,326, 6,530,221, and 6,336,317, hereby incorporated by reference As used herein, the term "hollow fiber membrane" refers to a device that can server to transfer gases and hydrophobic vapors between two physical forms of matter, including but not limited to gases and liquids.

The term "generator skid unit" refers to a complete, self-contained generator apparatus for use in commercial applications.

The term "heat exchanger" refers to a device built for efficient heat transfer from one device to another, whether a solid wall separates the fluids so that they never mix, or the fluids are directly contacted. Heat exchangers are typically described by their flow arrangement. In counter-flow heat exchangers the fluids enter the exchanger from opposite ends. The counter-flow design is the most efficient design for a heat exchanger in that it can transfer the greatest amount of heat. There are many types of heat exchangers, including plate-in-frame, or simply plate, heat exchangers. This type of heat exchanger uses metal plates to transfer heat between two liquids. Plate-in-frame heat exchangers are generally arranged in such ways that separate channels of hot and cold liquid alternately form.

The term "pounds force per square inch gauge" (psig) refers to a pressure gauge that has been calibrated to read zero pounds force per square inch at sea level.

The term "embedded computer system" refers to a special purpose computer system designed to perform a dedicated function. Unlike a general-purpose computer, such as a personal computer, an embedded computer system performs one or a few pre-determined tasks, usually with very specific requirements, and often includes task-specific hardware and mechanical parts that are not usually associated with a general-purpose computer.

What is claimed is:

1. A device comprising:
   i) a compressor configured to compress feed air into a first compartment providing compressed air at an elevated temperature relative to said feed air;
   ii) a membrane bank comprising a casing and a plurality of selectively permeable gas membranes positioned between said first compartment and a second compartment;
   iii) a valve configured to divert a portion of said compressed air at said elevated temperature from said first compartment to pass around said membrane bank casing; and
   iv) a steel framework for housing said device comprising at least one open side consisting of a plurality of attached vertical and horizontal members, and a solid support attached to said plurality of horizontal members.

2. The device of claim 1, wherein said compressor compresses said feed air at a pressure above 10 psig and below 1000 psig.

3. The device of claim 1, wherein said heated gas membranes are at a temperature equal to or above said compressed air.

4. A method of generating a component enriched gas comprising:
   a) providing a device comprising:

i) a compressor configured to compress feed air into a first compartment providing compressed air at an elevated temperature relative to said feed air;

a membrane bank comprising a casing and a plurality of selectively permeable gas membranes positioned between said first compartment and a second compartment;

iii) a valve configured to divert a portion of said compressed air at said elevated temperature from said first compartment to pass around said membrane bank casing, and;

iv) a steel framework for housing said device comprising at least one open side consisting of a plurality of attached vertical and horizontal members, and a solid support attached to said plurality of horizontal members; and b) compressing said feed air into said first compartment so as to create said compressed air at an elevated temperature relative to said feed air;

c) diverting said portion of said compressed air from said first compartment to said membrane bank casing under conditions such that said gas permeable membranes are heated to a temperature of at least said compressed air;

d) moving said compressed air through said heated selectively permeable gas membranes without condensate formation thereby providing a component enriched gas to said second compartment.

5. The method of claim 4, wherein said component enriched gas is nitrogen gas.

6. The method of claim 4, wherein said method further comprises the step of cooling said first compartment.

7. The method of claim 4, wherein said compressed air is above 10 and below 1000psig.

* * * * *